United States Patent Office 3,465,076
Patented Sept. 2, 1969

3,465,076
PROCESS FOR PRODUCING SYNTHETIC RESIN ARTICLE HAVING MAR-RESISTANT SURFACE
Ko Asami, Yokohama, and Hiroshi Hariu, Yamaguchi-ken, Japan, assignors to Mitsubishi Rayon Co., Ltd., Tokyo, Japan, a corporation of Japan
No Drawing. Filed Oct. 11, 1965, Ser. No. 494,920
Claims priority, application Japan, Oct. 13, 1964, 39/58,258; Mar. 18, 1965, 40/15,834; July 15, 1965, 40/42,816; July 16, 1965, 40/42,902
Int. Cl. B29c 9/00; B29d 3/00
U.S. Cl. 264—255
10 Claims

ABSTRACT OF THE DISCLOSURE

An acrylic resin article having a thin mar-resistant surface is produced by coating the inside surface of a mold member with a thin layer of a mixture of diethylene glycol bisallylcarbonate (GAC) and a polymerization initiator therefor. The layer is substantially completely polymerized in an oxygen free environment. An acrylic monomer is then cast into the coated mold and polymerized. The mold is then removed. The oxygen free environment can be achieved with an inert gas or by covering the layer of GAC with a thin film of material such as polypropylene or aluminum foil.

---

The present invention relates to a process for producing synthetic resin articles characterized by a mar-resistant surface, wherein a mar-resistant film of a diethylene glycol bisallylcarbonate polymer has been adhered to the surface of a synthetic resin predominantly consisting of an acrylic resin, particularly methyl methacrylate, and a considerably shock-resistant substrate part.

It is already known to apply a coating of a partially polymerized monomer to an abrasion-resistant resin such as an allyl methacrylate (U.S. Patent No. 2,479,935) or a diethylene glycol dimethacrylate (U.S. Patent No. 2,-997,745) by coating the inner surface of a mold member with a partially polymerized monomer for an abrasion-resistant resin and charging the mold with a substrate resin material which is polymerized simultaneously with the coating, in order to impart an abrasion resistance to the surface of the substrate synthetic resin. This procedure has a disadvantage in that the coating applied to the inner surface of a mold member is apt to be swollen or dissolved with the substrate resin material, which is poured into the mold later, since said coating has not been sufficiently polymerized. As a result the abrasion-resistance of the resultant resin is generally considerably inferior to that of the abrasion-resistant resin itself, which has been adhered to the surface of the resin.

We have now found that the affinity of a poly(diethylene glycol bisallylcarbonate), one of the most mar-resistant synthetic resins, for an acrylic resin is remarkably greater than the affinity thereof for the inner surface of a mold which is ordinarily employed in the preparation of an acrylic resin, for example, molds of or inorganic glass plate, cast iron, stainless steel, nickel, or chrome plated metal or aluminum. Our studies on processes for polymerizing the diethylene glycol bisallylcarbonate on the inner surface of a mold member and on the adhesive property between a coating of almost perfectly polymerized diethylene glycol bisallylcarbonate and an acrylic resin has led to the present invention.

According to this invention, there is provided an industrially excellent process for producing a synthetic resin article having both a superior mar-resistance and a considerable shock resistance wherein the surface of the resin may perfectly reproduce the inner surface of the mold. Said surface consists of poly(diethylene glycol bisallylcarbonate) having a superior mar-resistance. The substrate part is an acrylic resin having a considerable shock resistance, particularly a homopolymer of methyl methacrylate or a copolymer essentially consisting of methyl methacrylate. The present invention also provides a process for preparing a film of poly(diethylene glycol bisallylcarbonate) which has been almost perfectly polymerized on the inner surface of a mold member employed for the above-mentioned purpose and is removed later with a close adhesion to the substrate resin which has been polymerized employing this mold. The present invention also provides a process for preparing a synthetic resin article having a beautiful appearance, a superior mar-resistance and a considerable shock resistance wherein the surface thereof is composed of poly(diethylene glycol bisallylcarbonate), which covered the inner surface of the mold, and the substrate part thereof is composed of an acrylic resin. Between said surface and said substrate part there is present one material selected from the group consisting of tracing paper, a cellophane sheet, a moisture-proof cellophane sheet, a cellulose triacetate film, a nylon film, the colored films thereof and the films thereof having a variety of patterns, and these three members are closely adhered to one another.

The present invention may be accomplished by coating the inside surfaces of mold members with diethylene glycol bisallylcarbonate and a polymerization initiator therefor, effecting a barrier between the coating and the surrounding air, carrying out a polymerization in the absence of oxygen, assembling the mold members with the poly(diethylene glycol bisallylcarbonate) film adhered thereto and pouring into the resultant mold an acrylic resin material and a polymerization initiator therefor. The mold is then closed and the contents heated to a temperature within the range from 30° C. to 150° C. to complete the polymerization, whereafter the resultant product is released from the mold.

The diethylene glycol bisallylcarbonate may be monomeric or in a partially polymerized state, so long as it is in a liquid state. In some cases, a partially polymerized material having a considerably higher viscosity than that of the monomer is convenient to use.

The polymerization initiator for diethylene glycol bisallylcarbonate may be any known peroxide, although benzoyl peroxide and di-isopropyl peroxydicarbonate are preferred. Coating the diethylene glycol bisallylcarbonate to the surface of mold members may be sufficiently accomplished by spraying, brushing or other suitable coating methods. Further, a mold releasing agent such as Aerosol OT containing sodium dioctyl sulfosuccinate as a main component may be incorporated into the diethylene glycol bisallylcarbonate to facilitate the releasing of the final product from the mold. An ultraviolet absorber and a colorant may be also added thereto.

It is an important point of the present invention to conduct the polymerization of diethylene glycol bisallylcarbonate on the surface of mold members in an oxygen free atmosphere.

A barrier between the coating and the oxygen in the surrounding air may be obtained by, as described in Example 1 later, maintaining the whole coated surface of the mold members in a nitrogen atmosphere, but a more suitable procedure for purposes of the present invention is to prevent oxygen in the immediate atmosphere of the coating by directly adhering a cover to the coated surface.

If the cover to be adhered to the coated surface is selected from the group consisting of a polyester film, a polyvinyl alcohol film, a polypropylene film, a polytetrafluoroethylene film and aluminium foil, a film of polymerized diethylene glycol bisallylcarbonate having a high adherence to the substrate resin may be obtained when this cover is removed after the completion of the polymerization of the diethylene glycol bisallylcarbonate. If the cover is selected from the above-mentioned group chosen from the results of numerous experiments, the polymer film will not separate from the surface of the mold when the cover is removed. In case of employing a water soluble polyvinyl alcohol film, it is possible to simultaneously dissolve the cover with water when the cover is removed. It is quite surprising that the film of diethylene glycol bisallylcarbonate polymer prepared under the condition wherein said cover is closely adhered thereto has a good affinity for the substrate resin. Further, in a procedure for excluding oxygen by adhering a cover to the coated surface, the polymerization may be accomplished by heating in an air bath. This is extremely advantageous from an industrial point of view and constitutes one of the great advantages of the present invention.

It is preferable to treat the surface of the film of substantially completely polymerized diethylene glycol bisallylcarbonate prepared by this process and adhered to the inner surface of a mold member with an alkaline liquid in order to improve and increase the adhesive property of said film surface to the acrylic resin. The alkaline liquids suitable for this purpose include a 0.1 to 5 percent aqueous solution of, for example, caustic soda, caustic potash, calcium hydroxide, barium hydroxide or ammonium hydroxide, and an alcoholic solution of caustic soda or caustic potash, and the like. A procedure for this treatment is to wash lightly the film surface with one of these alkaline solutions. Thereafter the treated film surface may remain as it is or washed with water and dried. By this simple treatment the adhesion of the surface part of substantially completely polymerized diethylene glycol bisallylcarbonate film to the substrate resin part may be surprisingly doubled.

The same treatment with a mixture of lower alcohol and miscible organic solvents is also effective.

When the cover to be adhered to the coated surface is selected from the group consisting of a cellulose triacetate film, a nylon film, a cellophane film, a moisture-proof cellophane film and tracing paper having a strong affinity for both the diethylene glycol bisallylcarbonate polymer and the substrate resin, a synthetic 3-component resin article containing a specific cover film adhered to and between the coating and the substrate part, may be obtained by completing the polymerization of the diethylene glycol bisallylcarbonate and then assembling the mold members with the resultant polymer film adhered to the inner surface of the mold members without separating the cover from the polymer film, and pouring into this mold a substrate resin material and a polymerization initiator therefor, closing the mold, and completing the polymerization of the substrate part, and finally releasing the resultant product from the mold. By this procedure a synthetic resin article having a peculiar beautiful appearance, a superior mar-resistance and a considerable shock resistance may be obtained, since the above-mentioned film may be colored or have any pattern.

The polymerization condition for the diethylene glycol bisallylcarbonate depends upon the thickness of the coating, the procedure employed for excluding oxygen, the specific cover adhered to the coated surface, the specific catalyst employed and the like, but it is generally preferable to carry out the polymerization at 60° C. to 140° C. for one to fifty hours. The polymerization may be carried out in two or more stages. When the polymerization is completed with the cover well stretched in the process, wherein the cover is adhered to the coated surface, a diethylene glycol bisallylcarbonate polymer film having a high uniformity may be obtained, which is suitable for the object of the present invention.

The mold members, to which a thin layer of substantially completely polymerized diethylene glycol bisallylcarbonate has been applied are assembled into a mold according to a well known process, such as the process described in U.S. Patent No. 3,087,197.

The most preferable mold member for this invention, is made of a tempered plate glass. A substrate resin material and a polymerization initiator therefor is poured into the assembled mold. The substrate resin material is essentially composed of methyl methacrylate or partially polymerized methyl methacrylate, but it may contain small quantites of methacrylic acid, other lower alkyl methacrylate, acrylic acid, a lower alkyl acrylate, styrene, an alkyl substituted styrene, ultraviolet absorbers, a colorant and the like. The polymerization initiator is preferably a well known oil soluble peroxide or azo compound initiator for these monomers. The closed mold is heated to 30° C. to 150° C. by a well known procedure, particularly, for example, the procedure described in U.S. Patent No. 3,087,197 for an industrial operation, to polymerize the substrate resin material. After the polymerization has been completed, the product is released from the mold. Thus a valuable synthetic resin article is obtained. In the releasing of the product from the mold, very few troubles may be encountered since the product may be very simply removed from the mold.

The following examples are presented to illustrate the present invention but are not to be construed, of course, as limiting the essence of the invention. In the examples, the mar value is expressed as the following measured value. Thus a test piece is rotated at a rotation speed of 11 r.p.m. around a vertical axis while being inclined at an angle of 45° to a horizontal direction, and 300 grams of carborundum is dropped from a point of 70 cm. above the test piece. The mar value may be expressed as a value of the haze after the dropping of carborundum minus the haze before the dropping of carborundum, wherein the haze is calculated by an equation:

$$\text{Haze} = \frac{\text{total luminous transmittance} - \text{parallel luminous transmittance}}{\text{total luminous transmittance}} \times 100(\%)$$

EXAMPLE 1

A mixture of diethylene glycol bisallylcarbonate, which is referred to hereinafter as GAC, and 5 percent by weight of benzoyl peroxide, which is referred to hereinafter as BPO, was applied to one surface of a tempered glass sheet having a size of 610 mm. x 450 mm. and a thickness of 12 mm. to form a coating having a thickness of about 0.03 mm. The coated surface was covered with a clean glass sheet, and a gap between these two glass sheets was sealed with a gasket made from a flexible polyvinyl chloride tube having a diameter of 6 mm. and a thickness of 1.3 mm. and the gasket was bored at three points so that there might be enough ventilation between the inside and the outside. Flexible polyvinyl chloride tubes having a diameter of 3 mm. and a thickness of 0.5 mm. were put into the resultant holes and the gaps between the holes and the polyvinyl chloride tubes were sealed by melting the tubes. The inside was purged with nitrogen by gradually flowing gaseous nitrogen into one of said polyvinyl chloride tubes and taking out the air in the inside from the other polyvinyl chloride tubes. After all the vents had been closed, the whole was kept in a horizontal position and heated at 65° C. for three hours and then at 100° C. for 40 hours in an air bath. Thus GAC was almost perfectly polymerized into a film having a thickness of about 0.03 mm. The resultant glass sheets, to which the film of polymerized GAC had been adhered, were assembled into a mold by placing said two coated glass sheets oppositely with the coated film as the inner surface and sealing the circumference with a flexible polyvinyl chloride gasket. Into the resultant mold, partialy polymerized methyl methacrylate (a viscosity of 60 centipoises) containing 0.05 percent by weight of azobisisobutyronitrile, which is referred to hereinafter as AIBN, was poured. After the space between two glass sheets of the mold had been adjusted to be 3.4 mm., the mold was closed. This mold was heated at 50° C. for 16 hours in a water bath and heated at 100° C. for 2 hours in an air bath, and the mold was then removed, and the resultant resin sheet was released.

The film of polymerized GAC was perfectly adhered to the substrate resin sheet, and the product was a resin sheet having a lustrous and beautiful surface free of fine wrinkles or roughness.

The mar value of this sheet was measured to be 10 percent and remarkably lower compared with the mar value of 55 percent for a conventional acrylic sheet without such a treatment.

EXAMPLE 2

A mixture of GAC and 5 percent by weight of diisopropyl peroxydicarbonate, which is referred to hereinafter as IPP, was applied to one surface of a glass sheet. A commercial polyester film having a thickness of 0.025 mm. and containing polyethylene terephthalate as a main component was adhered to the coated surface taking care that bubbles did not enter, and the thickness of the GAC layer was adjusted to be about 0.03 mm. After the whole had been heated at 70° C. for 4 hours in an air bath, the polyester film was stripped off. The stripping was simple, and only the film of almost perfectly polymerized GAC was left to be adhered to the glass sheet.

A mold was produced employing two of the resultant glass sheets. Partially polymerized methyl methacrylate was polymerized to give a resin sheet by the same procedure as in Example 1 with this mold.

Thus, the film of polymerized GAC was perfectly transferred to the acrylic resin sheet, and a resin sheet having a beautiful surface free of fine wrinkles or roughness was obtained. The mar value of this resin sheet was 12 percent.

EXAMPLE 3

A mixture of GAC and 5 percent by weight of IPP and 5 percent by weight of BPO was applied to one surface of a glass sheet. A polyester film having a thickness of 0.025 mm. was adhered to the coated surface, and the GAC layer was adjusted to have a thickness of about 0.03 mm. After the whole had been heated at 110° C. for two hours in an air bath, only the polyester film was stripped, and the remainder was then heated at 120° C. for one hour. GAC was almost perfectly polymerized and became a film adhered to the glass sheet.

Into a mold obtained by placing two of the resultant coated glass sheets oppositely, a partially polymerized mixture of 95 percent of methyl methacrylate and 5 percent of ethyl acrylate containing 0.05 percent of AIBN was poured. After the mold had been adjusted so that the thickness of a resin sheet product might be 2 mm. the mold was closed. The mold was heated in an autoclave at 90° C. for 1.5 hours under a hydraulic pressure of 2.5 kg./cm.² The mold was removed. The film of polymerized GAC was perfectly transferred to the resultant resin sheet. The mar value of this resin sheet was found to be 12 percent.

EXAMPLE 4

A mixture of GAC and 0.005 percent by weight of Aerosol OT and five percent by weight of IPP was applied to one surface of a glass sheet. A polyester film having a thickness of 0.025 mm., previously stretched and fixed to a frame was adhered to the coated surface, and the GAC layer was adjusted to have a thickness of about 0.03 mm. The whole was heated at 100° C. for three hours in an air bath, and only the polyester film was then stripped. The surface of polymerized GAC remaining on the glass sheet was washed with methanol. Into a mold obtained by placing two of the resultant coated glass sheets oppositely, a partially polymerized mixture of 95 percent of methyl methacrylate and 5 percent of methacrylic acid containing 0.05 percent by weight of AIBN was poured. After the space between two glass sheets of the mold had been adjusted so that the thickness of the sheet product may be 3 mm., the mold was closed. The mold was heated at 50° C. for 12 hours in a water bath and at 120° C. for two hours in an air bath. The film of polymerized GAC was perfectly transferred to a resin sheet obtained by removing the mold. The resin sheet had a smooth surface and a mar value of 14 percent. This product was optically excellent.

EXAMPLE 5

A mixture of GAC and 5 percent by weight of IPP and 3 percent by weight of BPO was applied to one surface of a glass sheet. A commercial water soluble polyvinyl alcohol film having a thickness of 0.03 mm. was adhered to the coated surface so that the GAC layer may have a thickness of about 0.03 mm. After the whole had been heated at 100° C. for the three hours, the polyvinyl alcohol film was removed while dissolving the film with water, and the remainder was further heated at 130° C. for one hour. GAC was almost perfectly polymerized into a film. A resin sheet was obtained in the same manner as in Example 1 employing a mold made of two of the resultant glass sheets, to which the film of polymerized GAC had been adhered. Thus the GAC film was transferred to the acrylic resin sheet, the mar value of which was found to be 15 percent.

EXAMPLE 6

A resin sheet was prepared using the same procedure except substituting a polypropylene film having a thickness of 0.05 mm. and without a large quantity of an antioxidant for the polyester film in Example 3. The resultant resin sheet was beautiful and had a surface free of roughness and fine wrinkles, and was found to have a mar value of 13 percent.

EXAMPLE 7

A mixture of GAC and 5 percent by weight of IPP was applied to one surface of a glass sheet. Aluminium foil having a thickness of 0.02 mm. was adhered to the coated surface so that the GAC layer might have a thickness of about 0.01 mm. After the whole had been heated at 100° C. for three hours in an air bath, the aluminium foil was stripped. This stripping had no effect upon the GAC film. A resin sheet was prepared in the same manner as in Example 1 employing a mold obtained by placing two of the resultant glass sheets, to which the film of substantially completely polymerized GAC had been adhered to, oppositely. Thus the GAC film was transferred to the acrylic resin sheet, the mar value of which was found to be 13 percent.

EXAMPLE 8

Example 2 was repeated except that the surface of the film of polymerized GAC was washed with a two percent aqueous solution of caustic soda and dried at 120° C. for ten minutes after the polyester film had been stripped. The resultant resin sheet was found to have a mar value of 11 percent. When this resin sheet was sawed at several points, the film of polymerized GAC adhered to the acrylic resin could not be separated.

EXAMPLE 9

Example 8 was repeated except that a one percent methanolic solution of caustic potash was applied to the surface of the film of polymerized GAC and said film was then washed with methanol and dried at a room temperature instead of washing the film with a two percent aqueous solution of caustic soda and drying the washed film at 120° C. for ten minutes. The resultant resin sheet had a mar value of 11 percent and a beautiful surface free of roughness or fine wrinkles. The surface part could not be separated from the substrate part by sawing the resin sheet at several points.

EXAMPLE 10

A mixture of GAC and five percent by weight of IPP was applied to one surface of a tempered glass sheet. Tracing paper was adhered to the coated surface so that the GAC layer might have a thickness of 0.02 mm. The whole was heated at 70° C. for four hours in an air bath while maintaining it in a horizontal position. A mold was assembled by placing oppositely two of the resultant glass sheets with tracing paper as an inner surface. Into the resultant mold partially polymerized methyl methacrylate containing 0.05 percent of AIBN and having a viscosity of 100 centipoises was poured. The mold was adjusted so that the resin sheet product might have a thickness of 3 mm. The mold was then closed, and heated at 50° C. for 16 hours in a water bath and at 100° C. for two hours in an air bath. When the mold was removed, a resin sheet was obtained to which tracing paper and the film of polymerized GAC had been perfectly adhered. The product had an even and glossy surface, the color of tracing paper and an excellent mar-resistance.

EXAMPLE 11

A mixture of GAC and 5 percent by weight of IPP was added to one surface of a tempered glass sheet. A cellulose triacetate film was adhered to the coated surface so that the GAC layer might have a thickness of 0.02 mm. The whole was heated at 70° C. for 4 hours and at 130° C. for 2 hours in an air bath. A mould was produced employing two of the resultant glass sheets with cellulose acetate triacetate films on inner surfaces. Partially polymerized methylmethacrylate was polymerized to give a resin sheet by the same procedure as in Example 10 with this mold. The resultant resin sheet had a mar value of 28 percent and an even and beautiful surface.

EXAMPLE 12

Example 10 was repeated except that a clear moisture-proof cellophane was employed in place of tracing paper. Thus a resin sheet having a mar value of 12 percent and a smooth surface was obtained.

EXAMPLE 13

Example 11 was repeated except that a nylon film having a thickness of 0.04 mm. was employed in place of cellulose triacetate film. Thus a resin sheet having a mar value of 12 percent was obtained.

EXAMPLE 14

Example 3 was repeated with a good result except that a polytetrafluoroethylene film was employed in place of polyester film.

EXAMPLE 15

Example 8 was repeated with a good result except that a 0.05 percent aqueous solution of barium hydroxide was employed in place of two percent aqueous solution of caustic soda.

What we claim is:

1. A process for producing a synthetic resin article having a mar-resistant surface and a shock-resistant substrate which comprises:
    coating an inside surface of a mold member with a thin layer of a mixture of a polymerizable material and a polymerization initiator therefor, said polymerizable material being selected from the group consisting of diethylene glycol bisallylcarbonate, partially polymerized diethylene glycol bisallylcarbonate, and a mixture thereof;
    effecting a barrier between said coating and surrounding air;
    heating the assembly to substantially compeltely polymerize said coating;
    pouring an acrylic resin material into a mold, at least one member of which comprises said coated mold member, said acrylic resin material consisting essentially of methyl methacrylate and a polymerization initiator therefor;
    closing said mold;
    heating said mold at a temperature within the range 30° C. to 150° C. to effect polymerization of said acrylic resin, and
    removing the mold after polymerization is complete.

2. A process as defined in claim 1 wherein said barrier is effected between the coating and the surrounding air by closely adhering a cover to said coating, and substantially completely polymerizing said coating.

3. A process as defined in claim 2 wherein said cover is a moisture-proof cellophane film.

4. A process as defined in claim 2 wherein said cover is selected from the group consisting of cellulose triacetate film, cellophane film, nylon film and tracing papers.

5. A process as defined in claim 2 which further comprises stripping said cover from the substantially completely polymerized coating.

6. A process as defined in claim 5 wherein said cover is a polyester film.

7. A process as defined in claim 5 wherein said cover is a polyvinyl alcohol film.

8. A process as defined in claim 5 wherein said cover is selected from the group consisting of aluminum foil, a polytetrafluoroethylene film and a polypropylene film.

9. A process as defined in claim 5 wherein said cover is stretched and closely adhered to said coating to form a thin film having a uniform thickness, said cover remaining in its stretched condition until said coating is substantially completely polymerized.

10. A process for producing synthetic resin articles having a thin mar-resistant surface and a shock-resistant substrate which comprises:
    coating an inside surface of a mold member with a mixture of a polymerizable material selected from the group consisting of diethylene glycol bisallylcarbonate, partially polymerized diethylene glycol bisallylcarbonate and a mixture thereof and a polymerization initiator therefor;
    effecting a barrier between said coating and surrounding air by closely adhering a stretched polyester film to said coating;
    heating the assembly to effect the substantially complete polymerization of said mixture while the film is kept in a stretched state;
    stripping the film from said polymerized coating;
    pouring an acrylic monomer, consisting essentially of methyl methacrylate and a polymerization initiator therefor, in a mold; said mold being obtained by assembling mold members, at least one of which is coated with said substantially completely polymerized mixture;
    closing the mold;
    heating the assembly to a temperature within the range 30° C. to 150° C. to effect polymerization of said acrylic monomer, and removing the mold.

References Cited

UNITED STATES PATENTS

| | | | |
|---|---|---|---|
| 2,444,533 | 7/1948 | Richardson | 264—255 X |
| 2,445,536 | 7/1948 | Parsons. | |
| 2,750,319 | 6/1956 | Sanders | 264—250 X |
| 2,962,764 | 12/1960 | Trojanowski et al. | 264—26 X |
| 2,997,745 | 8/1961 | Kroeker | 264—240 |
| 3,012,287 | 12/1961 | Tucker | 264—240 X |
| 2,479,935 | 8/1949 | Johnson | 264—1 |
| 3,248,460 | 4/1966 | Naudokas | 264—1 |

(Other references on following page)

FOREIGN PATENTS 920,608  3/1963  Great Britain.

OTHER REFERENCES

Howard W. Starkweather, Jr. and Frederick R. Eirich, Allyl Polymerization Beyond the GRL Point, December 1955, pp. 2452–2455.

Sam L. Brous, A Tailored Allyl Ester, December 1945, pp. 107–110.

Pechukas, Strain and Dial, Modern Plastics, "Allyl-Type Cast Resins and Laminates," June 1943, pp. 101–104 and 138.

ROBERT F. WHITE, Primary Examiner

J. H. SILBAUGH, Assistant Examiner

U.S. Cl. X.R.

264—1, 85, 245